United States Patent [19]
Smith et al.

[11] Patent Number: 5,128,887
[45] Date of Patent: Jul. 7, 1992

[54] NUMERICAL ACCURACY INDICATOR FOR ROUNDED NUMERIC VALUE DISPLAY METHOD

[75] Inventors: Mark A. Smith; Chris M. Bunsen, both of Corvallis, Oreg.

[73] Assignee: Hewlett-Packard Company, Palo Alto, Calif.

[21] Appl. No.: 648,669

[22] Filed: Jan. 31, 1991

[51] Int. Cl.⁵ .......................... G06F 7/38; G06F 3/00
[52] U.S. Cl. ................................ 364/745; 364/710.05
[58] Field of Search .................. 364/710.01, 710.05, 364/710.07, 710.08, 710.10, 745

[56] References Cited

U.S. PATENT DOCUMENTS 4,081,859  3/1978  Goldsamt et al. ............... 364/709
4,545,022  10/1985  Hughins ......................... 364/709
4,580,235  4/1986  Yanagawa ..................... 364/710.05
4,744,044  5/1988  Stover et al. ................. 364/709 X

FOREIGN PATENT DOCUMENTS 52-38857  3/1977  Japan.

Primary Examiner—Long T. Nguyen

[57] ABSTRACT

In a calculating device, a method for indicating the round-off status of a fractional or decimal value displayed. This method includes receiving a numerical value, formatting the numerical value in either fractional or decimal form, and comparing the actual value with the formatted value. Thereafter, if the actual value is greater than the formatted value a "greater than" indicator is shown along with the formatted value, and if the actual value is less than the formatted value a "less than" indicator is shown along with the formatted value.

8 Claims, 2 Drawing Sheets

NUMERICAL ACCURACY INDICATOR FOR ROUNDED NUMERIC VALUE DISPLAY METHOD

FIELD OF THE INVENTION

The present invention relates to a method for indicating the round-off status of either a fractional numerical value displayed in a calculating apparatus in the form "a b/c" (where a, b and c are integers; "a" is the whole value characteristic and "b/c" represents a fraction); or a decimal numerical value displayed in the calculating apparatus when the display has been purposely truncated by the user or when the display is architecturally incapable of showing the full decimal value; or some other numerical value format.

BACKGROUND AND SUMMARY OF THE INVENTION

Typically, in computational and measurement apparatus which display numeric results, either in fractional, decimal or other form, some type of numerical round-of error exists. It is often desirable to the user of such apparatus to know whether the value displayed is the exact computed value, or if not, in which numerical direction the round-off was implemented.

At this juncture, no known attempt has been made to convey to the user of such calculating apparatus whether the value displayed is the exact value computed, or if it is greater or less than the actual value. While rounding off an actual computed value is helpful and necessary, it is not necessary that this operation be a source of errors for the user. The use of a round-off indicator will both warn the user that the displayed value is not the exact computed value, and inform the user of the direction in which the round-off was made. It is an object of the present invention to provide a convenient means by which to present this information to the user.

In accordance with the preferred embodiment of the present invention, and in conjunction with the display of pure fractional or decimal numerical value, a status indicator is used which employs three states: State 1 is shown if the displayed value has been rounded down from the actual computed value. State 2 is used to indicate that the displayed value has been rounded down from the actual computed value. State 3 indicates the displayed value has been rounded up from the actual computed value.

The foregoing and additional features and advantages of the present invention will be more readily apparent from the following detailed description, which proceeds with reference to the accompanying drawings.

DETAILED DESCRIPTION OF A PREFERRED EMBODIMENT

The Apparatus

Figure 1:
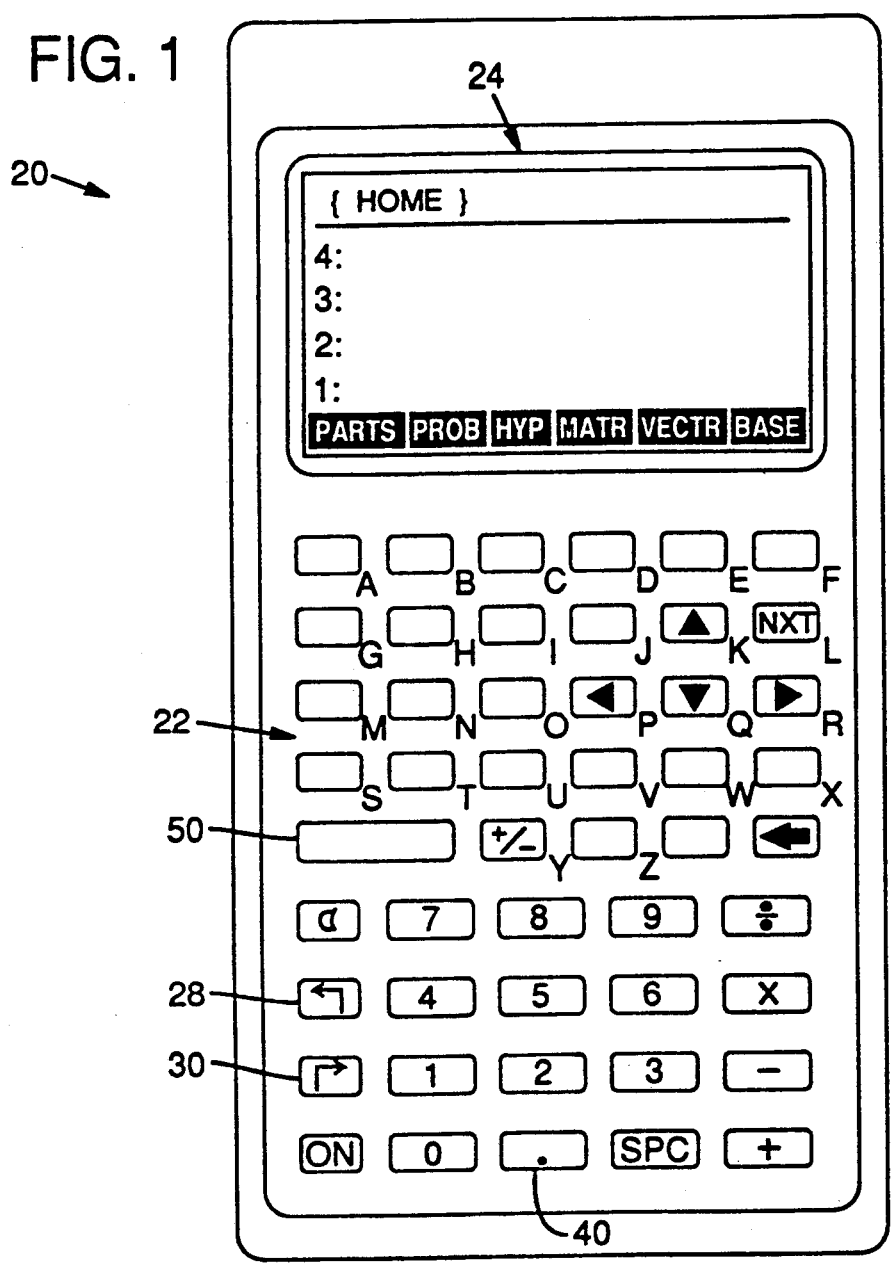
FIG. 1 shows the keyboard and display of a calculating device in accordance with the present invention.
Figure 2:
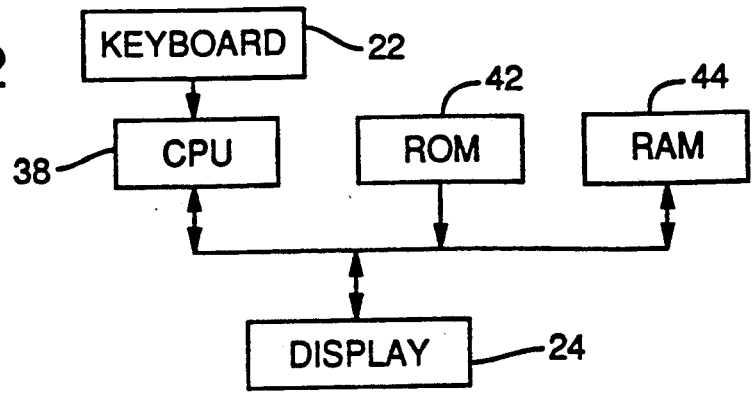
FIG. 2 shows the internal architecture of the calculating device of FIG. 1.

FIG. 1 shows a typical calculator 20 for use with the present invention. The hardware and architecture of the calculator 20 (shown in FIG. 2) may be of conventional design. The calculator includes an entry means such as a keyboard 22 and a display means such as an LCD display 24. On the face of the keyboard are a plurality of keys that each have a number of functions. Relevant to the present invention are a number of the keys, decimal point entry key 40, left and right shift keys 28 and 30 respectively, and an ENTER key 50.

The architecture of calculator 20 includes a central processing unit (CPU) 38 to which are connected via various buses the keyboard 22, the display 24 and memory in the form of ROM 42 and RAM 44. The instructions for operating the CPU are stored in the ROM 42 in a conventional manner. The RAM 44 is available for storing data entered via the keyboard 22 and generated by the CPU 38 in the process of performing computations according to the invention. Several flags and stack registers are also typically provided in association with the CPU 38.

It will be understood that any equivalent calculating device may be used, such as a general purpose computer. Equivalent to the keyboard would be any data entry device such as a mouse. Equivalent to the LCD display would be any type of display device such as a CRT, hard copy device, etc.

Entering Fractions

As contemplated in the present invention, fractions are real values of the form: "a b/c" or "b/c" where, a, b, and c are integers. Fractions can be entered onto a memory stack register at any time. This fraction entry method is the subject of a issued U.S. Pat. No. 5,089,980, entitled DOUBLE KEYSTROKE FRACTION ENTRY AND INTERFACE, assigned to the present assignee and incorporated by reference herein. Using the above-enumerated procedure, a user may enter almost any value as a fraction on the keyboard 22 of the calculator 20. This includes an improper fraction where the numerator is larger than the denominator. However, a typical calculator 20 will display an error sign if the user disregards circuit architecture restrictions. In the present invention, these restrictions include that the integer and numerator must never contain more than twelve digits total and the denominator must not contain more than four digits. Additionally, fractions may only be entered if the value base is ten (as distinguished from binary, octal, or hexadecimal).

Displaying Fractions

When the calculator 20 is initially energized, it will cause any entered values to be displayed in decimal format. The decimal-display mode is the default display mode. When the user desires to perform computations incorporating fractional values in the form "a b/c," or "b/c," CPU 38 can be reset to a fraction-display mode. This accomplished through depression of a shifted key combination 28 and 40. This key sequence switches between fraction-display mode and the default decimal-display mode.

In the fraction-display mode, values are evaluated internally as decimal values and subsequently displayed at 24 using the most precise fractions allowed. Implementation of this mode is as follows: For example, the key sequence: 12, ".", 3, ".", "8" may be entered. This displays characters as they are keyed in. "12 ⅜" is displayed on display 24. An ENTER key 50 is depressed. This terminates digit entry and displays the entered numeric value in the current default decimal display format. Finally, a shifted key combination 28, 40 is depressed. This displays the value as a fraction. "12 ⅜" is then displayed.

To further the example, ¾ can now be added to the value 12 ⅜ in the X-register (stack). The key sequence: 3, ".", ".", 4 or ".", 3, ".", 4 is entered. This displays characters as the user keys them in. "¾" is displayed. Next, the (+) key 62 is depressed. This keystroke adds the values in the X- and Y-registers and displays the result as a fraction. "13 ⅛" is displayed. Finally, the key sequence ENTER 50 and shifted key combination 28, 40 is depressed. This switches to the decimal display format and "13.1250" is displayed.

Display Parameters

The fraction calculated and displayed on display 24 may differ from the one entered. In its default condition, the calculator 20 displays a fractional value according to the following rules:
1. The value has an integer part and, if necessary, a proper fraction (the numerator is less than the denominator).
2. The denominator is no greater than 4095 as required by embodiment architecture.
3. The fraction is reduced as far as possible.

The following are examples of entered numeric values and the resulting displays. For comparison, the internal 12-digit values are also shown. The up arrow (Δ) and the down arrow (∇) indicators in the last column are explained below.

| Entered Value | Internal Value | Displayed Fraction |
| --- | --- | --- |
| 2⅜ | 2.37500000000 | 2⅜ |
| 14 15/32 | 14.4687500000 | 14 15/32 |
| 54/12 | 4.50000000000 | 4½ |
| 6 18/5 | 9.60000000000 | 9 3/5 |
| 34/12 | 2.83333333333 | 2 5/6 |
| 15/8192 | .183105468750 | 0 7/3823 |
| 12345678¹²³⁴⁵/3 | (invalid Entry) | |
| 16 3/16384 | (invalid Entry) | |

Accuracy Indicators

In accordance with the subject of the present invention, accuracy annunciators or indicators are incorporated into the display 24 to show the direction of any inaccuracy of the fraction compared to its 12-digit decimal value. The accuracy of a displayed fraction is indicated by either an up arrow (Δ) 82 or a down arrow (∇) 80 annunciator at the top of the display. This is shown in the magnified view of FIG. 4.

Figure 3:
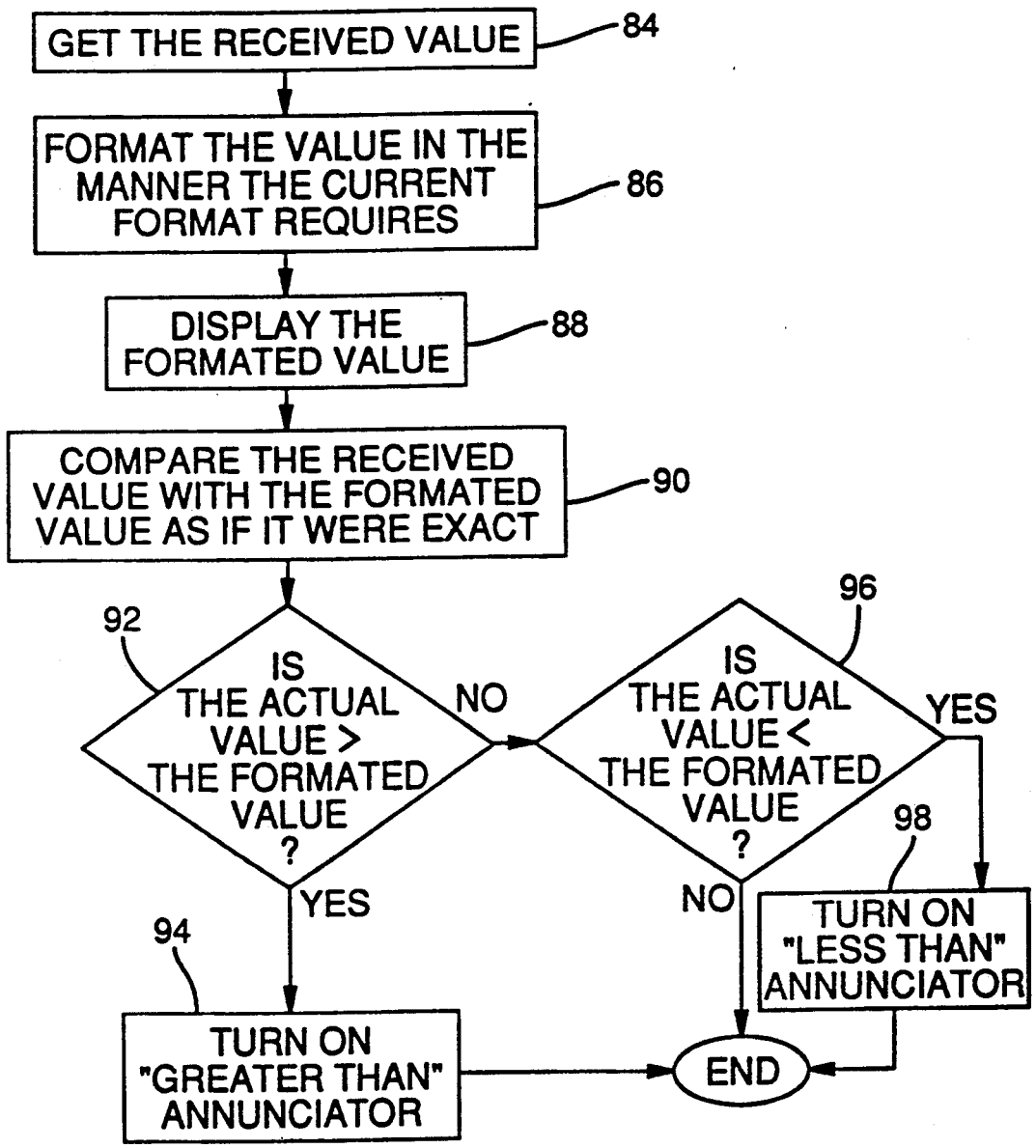
FIG. 3 shows a flow chart of a method according to the invention for indicating the round-off status of a displayed fractional or decimal value.

Referring now to FIG. 3, a flow chart of the method of the invention is shown with each step described herein referred to with a corresponding numeral. The CPU 38 receives a numeric value, which may be a single digit or multiple digits (84) and either calculated or entered as a fraction or decimal entry. Thereafter, that value is formatted in the manner prescribed by the current display mode of the calculating device (either fraction-display mode or decimal-display mode) as discussed above (86). Next, the entered value is displayed in the proper format (88). The CPU then compares the actual received value with the formatted value (90). If the actual value is greater than the formatted value (92), the "greater than" indicator (Δ) 82 is lit (94) on display 24 adjacent to the formatted value. If the actual value is less than the formatted value (96), the "less than" indicator (∇) 80 is lit (98) on display 24 adjacent to the formatted value. If the actual value exactly matches the formatted displayed value, no indicator is lit. Alternatively the roles of the indicators 80, 82 may be reversed if it is desirable to show which way the formatted value was rounded.

To reiterate, if up arrow 82 is lit, the fractional part of the internal 12-digit value is slightly greater than the displayed value, i.e., fraction or truncated decimal value. If down arrow 80 is lit, the fractional part of the internal 12-digit value is slightly less than the displayed value.

Figure 4:
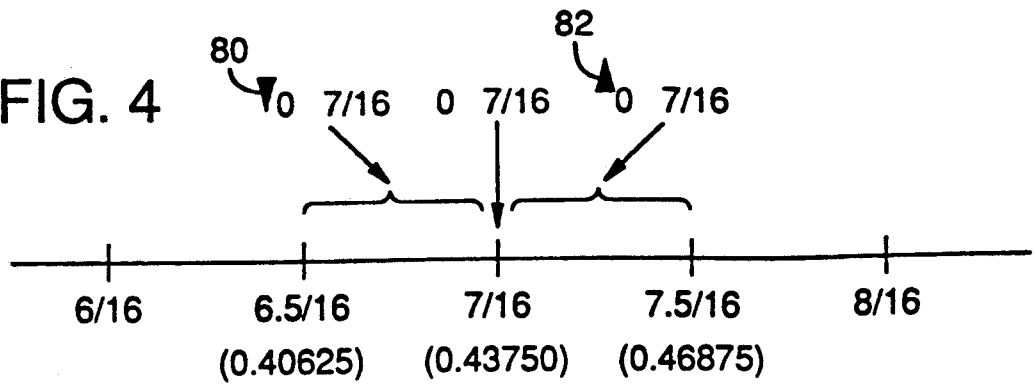
FIG. 4 shows an example of the display method in accordance with the preferred embodiment of the present invention.

This feature is especially important if the user implements changes as to how fractions are to be displayed. For example, if the user desires to force all fractions to have five as a denominator, then ⅔ is displayed as "(Δ) 0 3/5" because the exact fraction is approximately 3.3333/5 "a little above" 3/5. Similarly, −⅔ is displayed as "(Δ) −0 3/5" because the true numerator is "a little above" 3. FIG. 4 shows how the displayed fraction relates to nearby values: the up arrow (Δ) 82 means the exact numerator is "a little above" than the displayed numerator. The down arrow (∇) 80 means the exact numerator is "a little below."

Occasionally an indicator is lit when the user would not expect it to be. For example, if the user enters 2 ⅜, then "(Δ) 2 ⅜" is shown on the display 24 even though that is the exact value entered. The calculator 20 always compares the fractional part of the internal value and the 12-digit value of just the fraction. If the internal value has an integer part, its fractional part contains less than 12 digits. Therefore it cannot exactly match a fraction that uses all 12 digits.

Having described and illustrated the principles of the contemplated invention with reference to a preferred embodiment, it should be apparent to those skilled in the art that the invention can be modified in arrangement and detail without departing from such principles. We claim all such modifications coming within the scope and spirit of the following claims.

We claim:
1. A calculating device, comprising:
   (a) a display;
   (b) a board having a plurality of keys including keys for entering numeric values; and
   (c) processing means for:
      receiving a numeric value;
      formatting the numeric value in a format prescribed by the calculating device;
      comparing the formatted numeric value with the received numeric value; and
      indicating on the display whether the formatted numeric value is different from the received numeric value.
2. The calculating device of claim 1 wherein the processing means indicates on the display whether the received numeric value is greater or less than the formatted numeric value.
3. The calculating device of claim 1 wherein the received numeric value is an entered value.
4. The calculating device of claim 1 wherein the format prescribed by the calculating device is pre- scribed by a format key for truncating the display of a received numeric value.

5. The calculating device of claim 1 wherein a received numeric value is a calculated numeric value.

6. In a calculating device including a display and a keyboard, a method of indicating that a displayed numeric value is different from a calculated numeric value, comprising:
  calculating a numeric value from a computation;
  displaying the calculated numeric value in a format prescribed by the calculating device;
  comparing the displayed numeric value with the calculated value; and
  indicating on the display whether the displayed numeric value is different from the calculated numeric value.

7. The method of claim 6 wherein the display format is prescribed by a format key on the keyboard of the calculating device.

8. In a calculating device including a display and a keyboard, a method of indicating that a displayed numeric value is a rounding of an entered numeric value, comprising:
  receiving a numeric value;
  formatting the numeric value according to a format prescribed by the calculating device;
  comparing the formatted numeric value with the received numeric value;
  if the formatted numeric value is greater than the received numeric value, indicating on the display adjacent to the formatted value that the formatted numeric value has been rounded up from the received numeric value;
  if the formatted numeric value is less than the received numeric value, indicating on the display adjacent to the formatted value that the formatted numeric value has been rounded down from the received numeric value; and
  if the formatted numeric value is equal to the received numeric value, providing no indication of a rounding of the formatted value.

* * * * *